United States Patent [19]
Cohen et al.

[11] Patent Number: 6,073,199
[45] Date of Patent: *Jun. 6, 2000

[54] HISTORY-BASED BUS ARBITRATION WITH HIDDEN RE-ARBITRATION DURING WAIT CYCLES

[75] Inventors: Gary Leon Cohen, Sunnyvale; Ken Yeung, Daly City, both of Calif.

[73] Assignee: Cisco Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/944,520

[22] Filed: Oct. 6, 1997

[51] Int. Cl.⁷ ..................................... G06F 13/36
[52] U.S. Cl. .................. 710/113; 710/107; 710/108; 710/110; 710/112; 710/116; 710/119; 710/123; 710/240; 710/241; 710/244; 711/146
[58] Field of Search ..................... 395/287, 288, 395/290, 292, 293, 296, 299, 303; 711/146; 710/107, 108, 110, 112, 113, 116, 119, 123, 240, 241, 244

[56] References Cited

U.S. PATENT DOCUMENTS

| | | |
|---|---|---|
| 4,237,534 | 12/1980 | Felix . |
| 4,644,532 | 2/1987 | George et al. . |
| 4,769,810 | 9/1988 | Eckberg, Jr. et al. . |
| 4,769,811 | 9/1988 | Eckberg, Jr. et al. . |
| 4,858,173 | 8/1989 | Stewart et al. ........................ 710/244 |
| 5,151,994 | 9/1992 | Wille et al. . |
| 5,265,223 | 11/1993 | Brockmann et al. . |
| 5,280,470 | 1/1994 | Buhrke et al. . |
| 5,317,696 | 5/1994 | Hilgendorf . |
| 5,404,556 | 4/1995 | Mahowatd et al. ........................ 712/1 |
| 5,471,590 | 11/1995 | Melo et al. ............................. 710/108 |
| 5,481,680 | 1/1996 | Larson et al. .......................... 710/112 |
| 5,524,215 | 6/1996 | Gay ........................................ 710/107 |
| 5,533,204 | 7/1996 | Tipley .................................... 710/108 |
| 5,535,395 | 7/1996 | Tipley et al. . |
| 5,621,897 | 4/1997 | Boury et al. ........................... 710/116 |
| 5,802,576 | 9/1998 | Tzeng et al. ........................... 711/146 |
| 5,862,355 | 1/1999 | Logsdon ................................. 710/116 |
| 5,948,094 | 9/1999 | Solomon et al. ....................... 710/118 |

*Primary Examiner*—Ayaz R. Sheikh
*Assistant Examiner*—Frantz Blanchard Jean
*Attorney, Agent, or Firm*—Marger Johnson & McCollom, P.C.

[57] ABSTRACT

An arbiter uses a history based bus arbitration scheme to more fairly allocate a shared resource among multiple devices. The arbiter uses a history queue to dynamically update the priorities of the devices using the shared resource, and makes the grant decision in a single calculation using the combination of the history queue and requests from bidding devices. The priority for granting master to each device is dynamically modified so that the least recently serviced requestor will be granted the shared resource. A hidden arbitration scheme provides more fair history based resource allocation. A bus retry scheme demotes priority for processing devices that are assigned bus master but do not perform bus operations within a predetermined number of clock cycles. The arbiter also prevents bus grants during hot swap operations.

23 Claims, 6 Drawing Sheets

HISTORY-BASED BUS ARBITRATION WITH HIDDEN RE-ARBITRATION DURING WAIT CYCLES

BACKGROUND OF THE INVENTION

This invention relates to arbitrating requests by devices in a computer system for a shared resource and more particularly to an arbiter that grants bus requests using a history based arbitration scheme in conjunction with a second hidden arbitration scheme.

Arbiters are used in computer systems to control access to a common bus used by multiple devices. Arbiters typically use arbitration schemes such as fixed priority, round robin, or rotating priority. A fixed priority algorithm assigns a priority to each device on the bus and grants usage based upon the relative priority of the devices making the requests. The round robin scheme has a fixed order and grants bus usage based upon the requestor order and the current user of the bus. The rotating priority scheme changes the priority of requestors based on a fixed algorithm.

The goal of all arbitration schemes is to insure fair access to the shared resource, and to efficiently grant the resource to the correct requestor. The fixed priority scheme is unfair because a high priority requestor can consume all the shared resource, starving the lower priority requestors. The round robin scheme is inefficient because multiple clocks may be required to determine which requestor should be granted the resource. Also round robin schemes have a fixed grant pattern that can result in starvation of particular requestors if request patterns match the round robin grant pattern. Rotating priority schemes are random in their efficiency and fairness based on the algorithm chosen to update device priority.

U.S. Pat. No. 5,481,680 issued Jan. 2, 1996 to Larson et al. describes a history based arbitration scheme. The history based arbitration scheme changes priority for granting devices control of a bus according to the history of previous bus grants and uses the history of past bus grants to grant control of the bus to the requestor serviced longest ago. The device granted the bus waits for the device currently controlling the bus to finish and then begins a new bus transaction.

While waiting for completion of current bus transactions, other devices with higher priority in the history based arbitration scheme (longest time since last bus grant) can request control of the bus. Since the arbiter has already granted the bus to another device, the device with higher history-based priority is unfairly denied control of the bus. Thus, the arbitration scheme in Larson will not fairly grant the bus to the device with the history based highest priority.

A device granted control of the bus may not actually initiate or complete a bus cycle. For example, a device may be reset or decide not to use the bus after the arbiter has already granted the device control of the bus on the next available bus cycle. Bus cycles are wasted or the system is hung up because the device granted control of the bus never conducts or completes the bus transaction.

Accordingly, a need remains for an arbitration scheme that more fairly grants access to shared resources while providing a more efficient and reliable operating environment.

SUMMARY OF THE INVENTION

An arbiter uses a history based bus arbitration scheme to more fairly allocate a shared resource among multiple devices. The arbiter is also faster in allocating the shared resource between multiple devices. The history based arbitration scheme is an improvement over round-robin arbitration schemes which only retain state information for the last device which was granted access to the shared resource. The arbitration scheme is an improvement over conventional history based arbitration schemes that prematurely grant bus control to devices with low priority. The arbitration scheme also increases bandwidth efficiency and system reliability by monitoring for aborted bus transactions and hot swapping conditions. In one embodiment, the shared resource comprises a bi-directional address and data bus and some control signals.

The history based arbitration scheme used in the arbiter is a rotating priority scheme that dynamically updates the relative priorities of the requestors. The arbiter maintains a history queue of the last N bus grants and uses the history queue to grant the bus to the requester serviced longest ago. Thus, the relative priorities of the requestors change dynamically based upon how recently they were granted use of the bus. Devices can request access to the bus at any time, and many devices request the bus simultaneously. The arbiter insures that only a single device uses the bus at one time, and that all requesting devices are fairly allocated use of the bus.

The arbiter uses a hidden arbitration scheme while waiting for the next available bus cycle. The arbiter grants the bus to one of the requesting devices while waiting for the previous bus master to relinquish control of the bus. If another device with a higher priority requests the bus before the previous bus cycle has completed, the arbiter deasserts the original bus grant and reasserts the bus grant to the new requester with the higher priority. The hidden arbitration more fairly grants the bus to low frequency/high priority requestors.

After the bus becomes idle, a newly granted master has a predetermined number of clock cycles to initiate a bus transaction. If the bus master does not initiate the bus transaction within the predetermined number of clock cycles, the arbiter grants the bus to the next highest priority requester. The new bus master will be able to immediately start the bus cycle since the bus is already idle. Even though the first bus master failed to start the bus cycle, a history queue is updated reflecting the first bus master as being granted the bus cycle. As a result, the first master has the lowest priority next time the devices bid for the bus. Thus, bandwidth is preserved by removing a grant and restarting arbitration if a bus requestor is slow.

A hot-swap signal is generated based on the status of connection pins for devices connected to the bus. The arbiter will not grant the bus to any requester while the hot-swap signal is asserted. Delaying bus transactions during hot swapping increases functional stability of the bus when bus devices are inserted or removed.

In one embodiment, the computer system uses a PCI bus having multiple devices that pass data between themselves and memory. All requesters are assumed to have equal priority to use the PCI bus. In this environment, the history based arbitration scheme insures every bus requestor is serviced with equal priority. The arbitration scheme is efficient because the grant decision is made in a single clock. The bus grant decision is generated according to a combinational equation based on the history queue and on which devices are currently requesting control of the PCI bus. The arbiter can be implemented with a Programmable-Logic-Device (PLD) or in software. For higher speed, the arbiter can be implemented with discrete logic.

The arbiter can use the history based arbitration scheme in combination with other priority schemes depending on computer system requirements. For example, one device may have super priority and the remaining devices may have equal priority. In this situation, the device with super priority always wins when making a bus request. However, any other devices bidding for the bus are considered to have equal priority and are granted control of the bus according to the history based arbitration scheme. Multiple requestors at times might not show up in a finite length history queue. For example, the history queue might only track the bus master for the last three bus cycles. Multiple devices that have not been granted bus master for longer than three bus cycles might request bus master of the next bus cycle. The arbiter can use another priority scheme, such as round robin, to grant the next bus cycles to one of the multiple requestors not appearing in the history queue.

The foregoing and other objects, features and advantages of the invention will become more readily apparent from the following detailed description of a preferred embodiment of the invention which proceeds with reference to the accompanying drawings.

DETAILED DESCRIPTION

Figure 1:
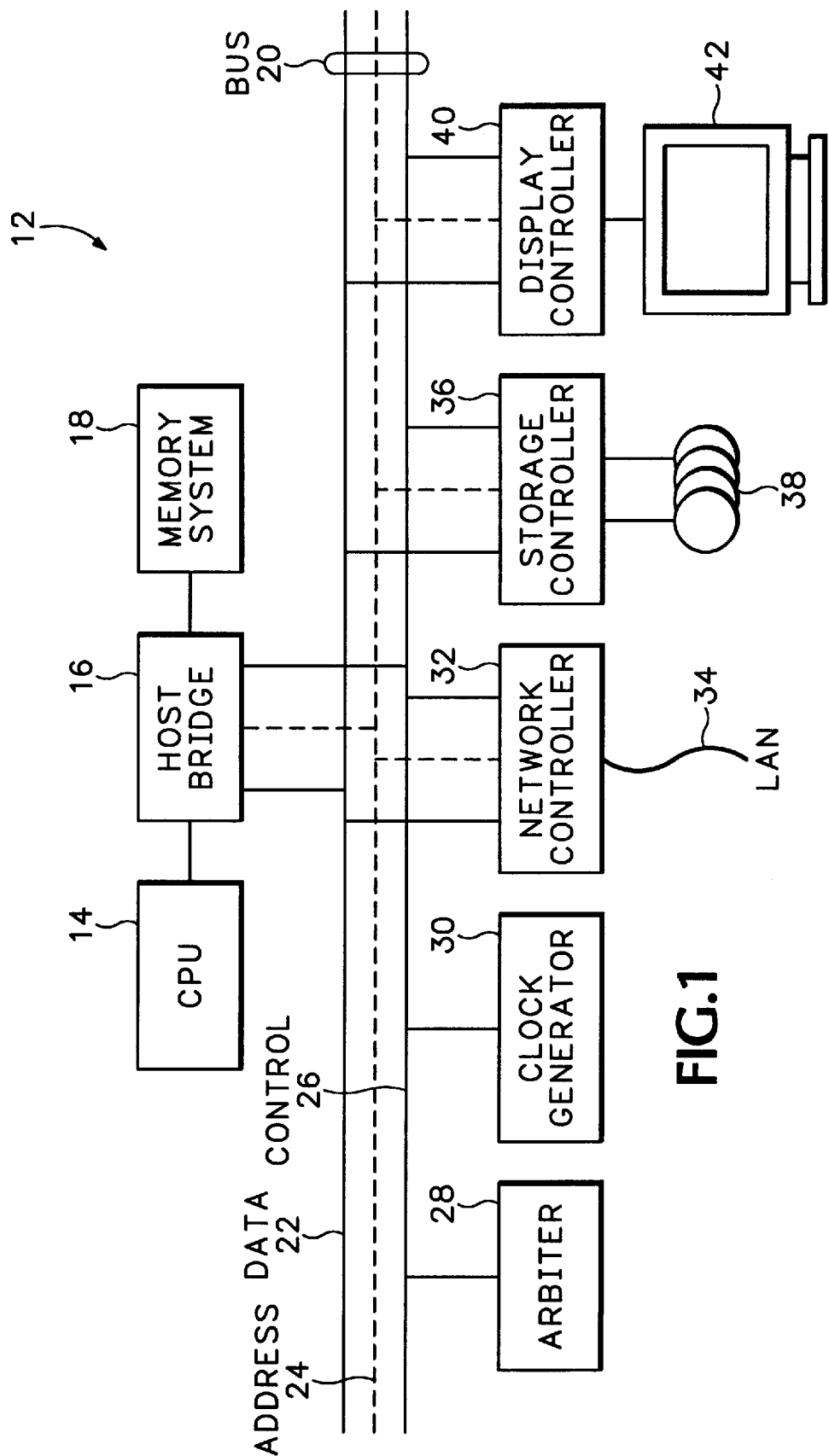
FIG. 1 is a block diagram of a computer system using an arbitration scheme according to the invention.

Referring to FIG. 1, a computer system 12 includes a bus 20 coupled to a CPU 14 and a memory system 18 through a host bridge 16. Various other devices are also coupled to the bus 20 and include a network controller 32 coupled to a local area network (LAN) 34, a storage controller 36 coupled to one or more disk drives 38 and a display controller 40 coupled to a display terminal 42. The bus 20 in one embodiment comprises a PCI bus and consists of a set of shared bi-directional data lines 22 and address lines 24. Bus 20 includes a set of unidirectional control lines 26 that are unique to each device. The shared control lines 26 carry command/byte enables for transaction identification, transaction control signals, unique bus request and grant signals between the arbiter and each device, clock signals and interrupt signals.

The peripherals 32–42 use the bus 20 to read and write to memory 18 and are controlled by the CPU 14 over the bus 20. Each device on the bus 20 can be either an initiator of a bus transaction or the target of a transaction. The CPU 14, host bridge 16, memory system 18, and the peripheral devices 32, 34, 36, 38, 40 and 42 are all commercially available devices known to those skilled in the art. Because the bus 20 is a shared medium that uses bidirectional signals, multiple devices cannot use the bus at the same time.

An arbiter 28 selects which device attached to the bus 20 initiates the next bus transaction. The arbiter 28 insures that only a single bus master is using the bus 20 during a bus transaction. The arbiter 28 also helps improve system performance by allocating the bus to different resources, and insuring that all requestors eventually are serviced.

The arbiter 28 uses a history based arbitration scheme to ensure fairness to all devices that may request access to the bus as bus master. The fairness is ensured by keeping a history queue that tracks which devices have previously been granted bus master. The history queue is updated each bus cycle according to which device was previously granted bus master. Bus master is granted by the arbiter in a single calculation according to the history queue information and bus request signals from bidding devices.

Figure 2:
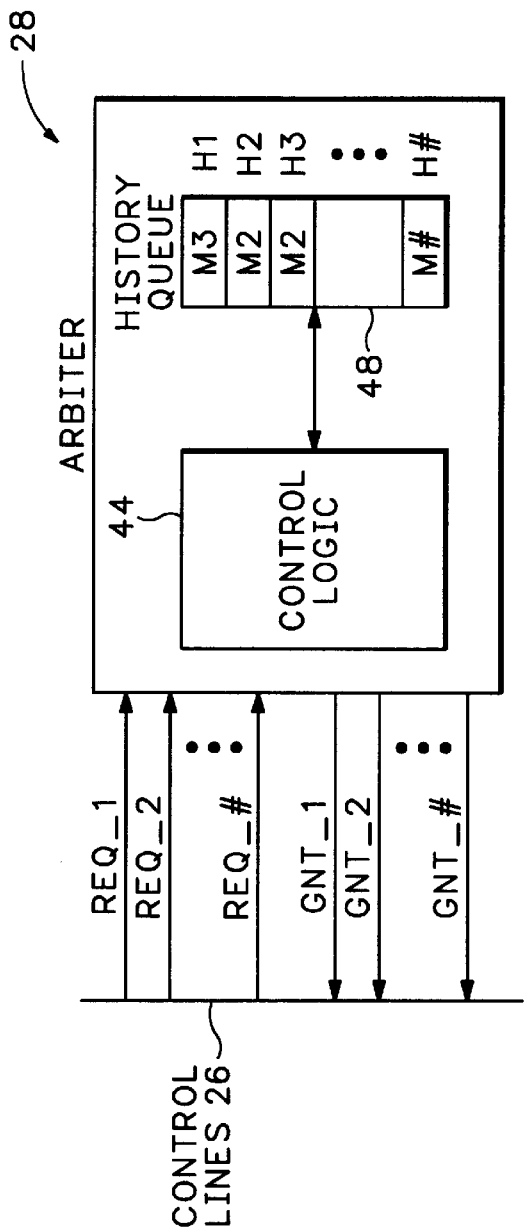
FIG. 2 is a detailed block diagram of an arbiter shown in FIG. 1.

Referring to FIG. 2, the arbiter 28 in one embodiment is a programmable logic device (PLD). The PLD includes control logic 44 and a history queue 48. The source code for the arbiter PLD is shown in attachment A. The bus request lines REQ_1 . . . REQ_# are generated by the multiple processing devices 16, 32, 36 and 40. The control logic 44 decides the relative priorities of the requestors based upon how recently the requestors were granted use of bus 20. The history queue 48 maintains a list of which devices M1, M2, M3 . . . M# have been granted control of bus 20 as bus master for previous bus cycles H1, H2, H3 . . . H#. For example, M1 may represent host bridge 16, M2 may represent network controller 32 and M3 may represent display controller 40, etc. The history queue 48 is updated dynamically each time another requestor is granted control of bus 20. Thus, the priority in which each device is granted control of bus 20 can change each bus cycle.

Figure 3:
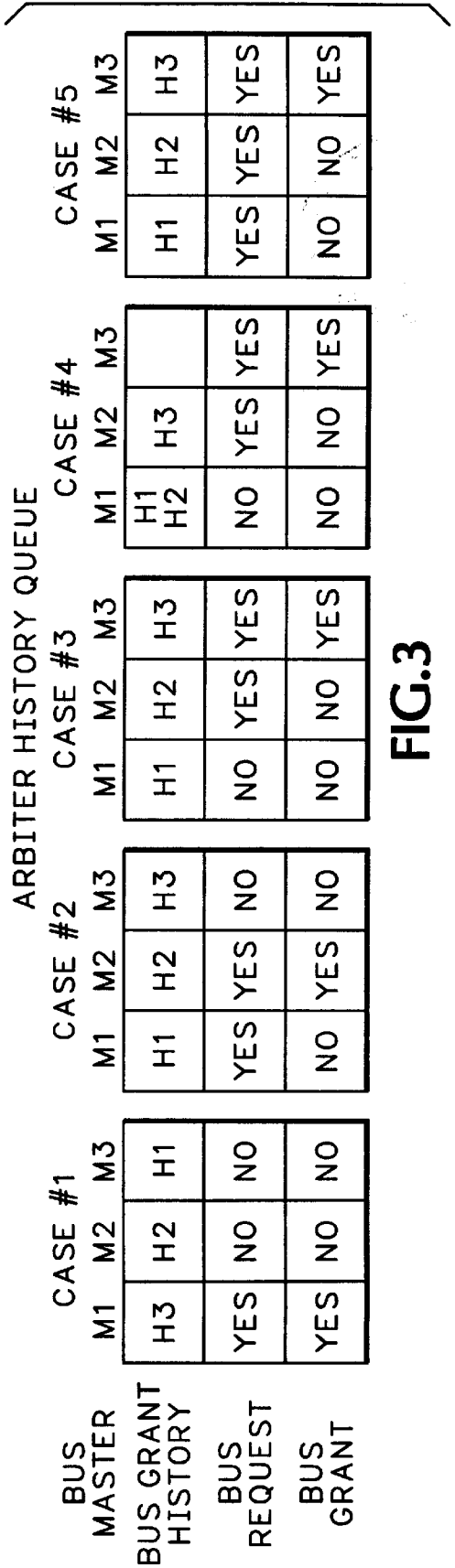
FIG. 3 is a schematic diagram showing the arbitration scheme used by the arbiter in FIG. 2.

FIG. 3 is a diagram showing the history based arbitration scheme used by the arbiter 28. The example shown in FIG. 3 is for 3 devices and for a history queue that is 3 levels deep. This means the arbiter 28 will keep track of the last three devices who have been granted bus masters of the bus 20. Based on the current list of bus requesters and the contents in the history queue 48, the arbiter 28 makes a grant decision within a one clock period. For simplicity, the example shown in FIG. 3 arbitrates between 3 devices with a history queue of the last 3 bus cycles. However, the invention can be implemented for additional devices and for a deeper history queue. The 3 devices vying for bus master are M1, M2 and M3. H1 represents the last bus cycle, H2 represents the second to last bus cycle, and H3 represents the third to last bus cycle.

In Case 1, M1 is the only requester for bus 20. The arbiter 28 will always then grant requester M1 as bus master. In Case 2, H1=M1, H2=M2 and H3=M2. The current requestors are M1 and M2. Since M1 was last granted the bus, the arbiter 28 grants the bus to M2. In Case 3, H1=M1, H2=M2 and H3=M3. The current requesters for bus 20 are M2 and M3. Since M2 was the second to last device granted the bus, the arbiter 28 grants the bus to M3. In Case 4, H1=M1, H2=M1 and H3=M2. The current requesters are M2 and M3. Since M2 was the third to last device granted the bus 20, the arbiter 28 grants the bus to M3. In Case 5, H1=M1, H2=M2 and H3=M3. The current requesters are M1, M2 and M3. Since M1, M2, respectively, were the last two devices granted the bus, the arbiter will grant the bus to M3.

The arbiter 28 assigns priority for all the possible cases of history and current requestor combinations. The arbiter 28 always provides better fairness by granting the bus to the devices who were the least recent bus master. The fairness of arbiter 28 is increased by extending the depth of the history queue 48.

For an arbiter 28 having a finite history queue, there are some corner cases in which the arbiter needs to impose some implicit priority. For example, in Case 6, H1=M1, H2=M1 and H3=M1. The current requesters are M2 and M3. Since only M1 was found in the history queue, the arbiter 28 cannot use the history queue 48 to decide which device should be assigned as the next bus master. In this case, the arbiter 28 is programmed to favor M2 and so M2 will be granted bus master.

Other arbitration schemes, such as a round-robin priority scheme, can also be used for corner cases. For example, in case 6, M2 is granted bus master. The next time multiple requesting devices are not found in the history queue, the next device in the round-robin priority scheme is granted bus master. Thus, when case 6 happens again, M3 is granted as bus master.

The arbiter can use the history based arbitration scheme in combination with other priority schemes depending on computer system requirements. For example, one device on bus 20 may require super priority and the remaining devices on bus 20 may have equal priority. In this situation, the device with super priority always wins when making a bus request. However, any other devices bidding for the bus are considered to have equal priority and are granted control of the bus according to the history based arbitration scheme shown in FIG. 3.

Figure 4:
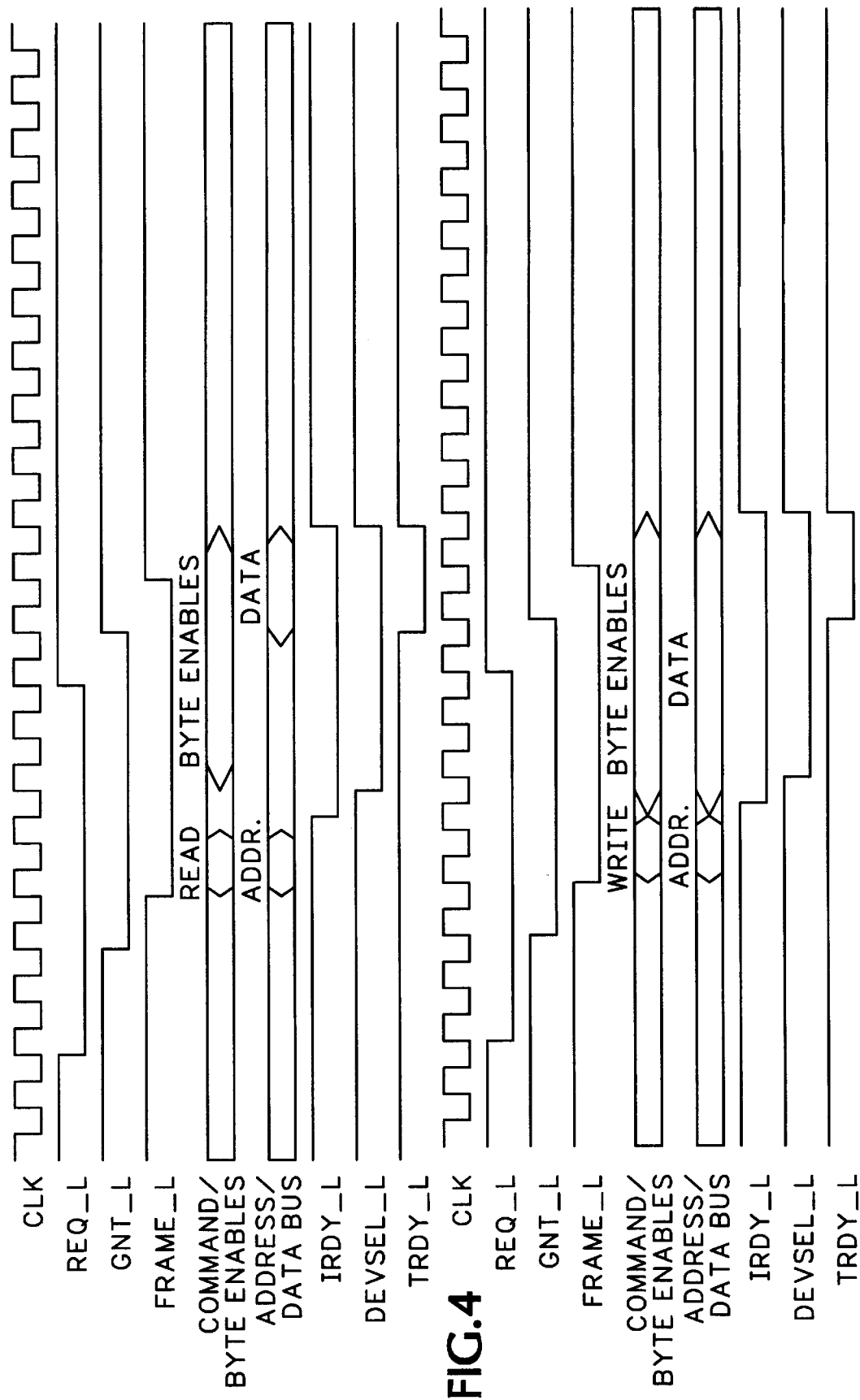
FIG. 4 is a timing diagram showing bus transactions for the computer system in FIG. 1.

Referring to FIG. 4, a bus cycle starts when one of the devices requests bus 20 from the arbiter 28 by asserting REQ_L. The arbiter evaluates all requests and then asserts GNT_L to a single device. Once a device has received the GNT_L signal it is now the bus master. The bus master asserts the FRAME_L signal and drives the address and the transaction command signals onto the bus 20. All other devices on the bus 20 evaluate this address. If the address targets a device, that device responds with DEVSEL_L. The bus master now drives IRDY_L and places write data onto the bus 20 (for write cycles) or waits for read data (for read cycles). The target device performs the read or write operation, and then asserts TRDY_L to indicate the operation is complete. The bus master continues to drive the FRAME_L signal and read or write data until it is finished, or until the target device performs a disconnect with the STOP_L signal. There are other types of transactions and other timing diagrams associated with the bus 20, however, the two transactions shown in FIG. 4 are typical.

Figure 5:
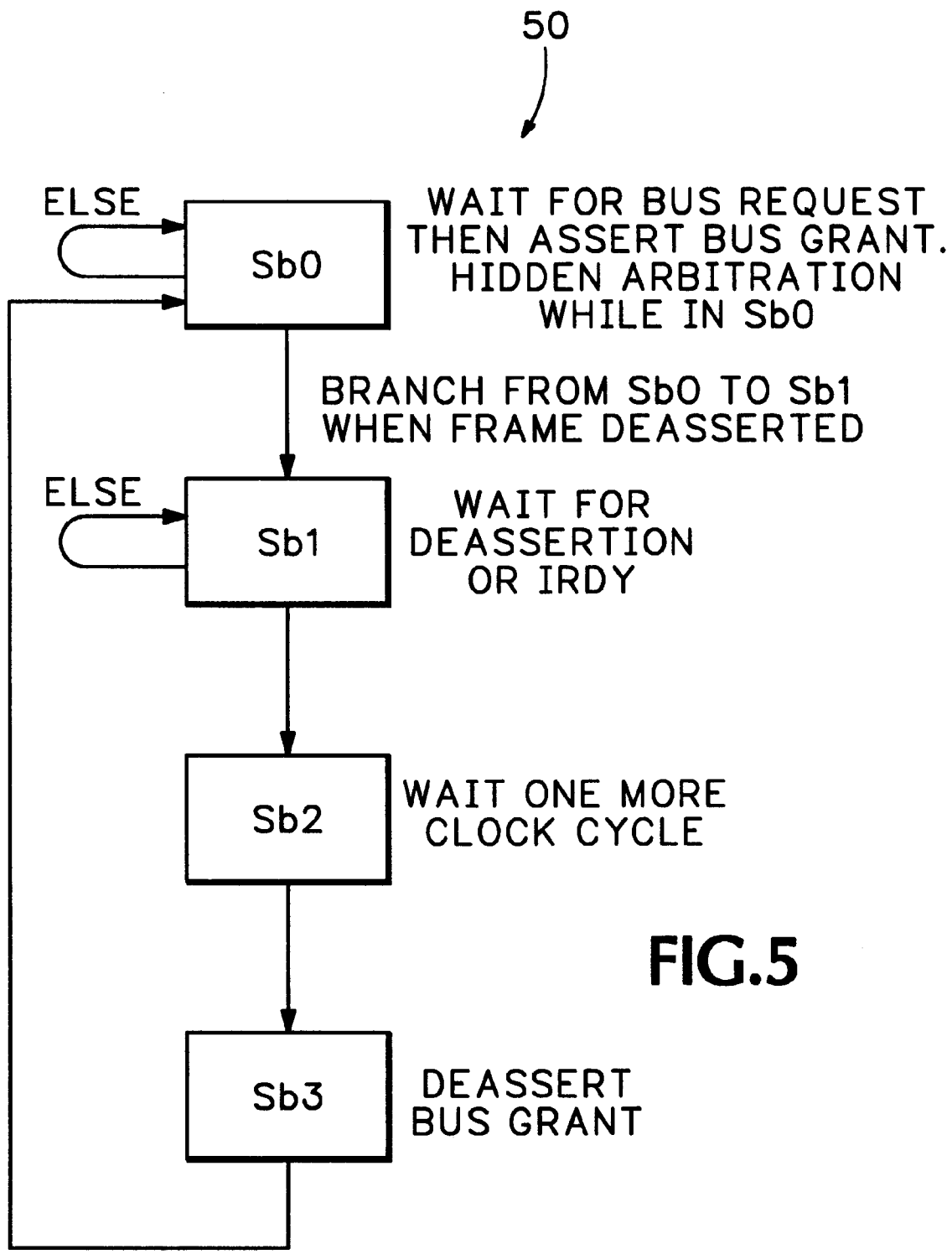
FIG. 5 is a state diagram for the arbiter shown in FIG. 2.

Referring to FIG. 5, the control logic 44 in FIG. 2 includes four states. A first state SbØ waits for one or more of the devices on bus 20 to assert their bus request lines REQ_#. If there is no bus request asserted, the logic circuit stays in state SbØ. In one embodiment of the invention, while in state SbØ, the bus 20 is parked on a default device, such as host bridge 16 (FIG. 1). As long as the bus 20 remains idle and the bus 20 is parked on the host bridge 16, the host bridge 16 is pregranted the bus. Parking pregrants the bus to a device, even though the device has not requested the bus. Thus, the parked device can acquire the bus on the next clock cycle. The arbiter typically parks on the device that most frequently requests the bus. If the arbiter 28 does not park on a device when the bus is idle, all devices must request the bus 20 before being granted bus master.

As soon as one or more devices assert their bus request signals REQ_L, arbiter 28 asserts the bus grant signal GNT_L for one of the bidding devices. The grant is given to the requestor that has least recently been granted bus master.

Figure 6:
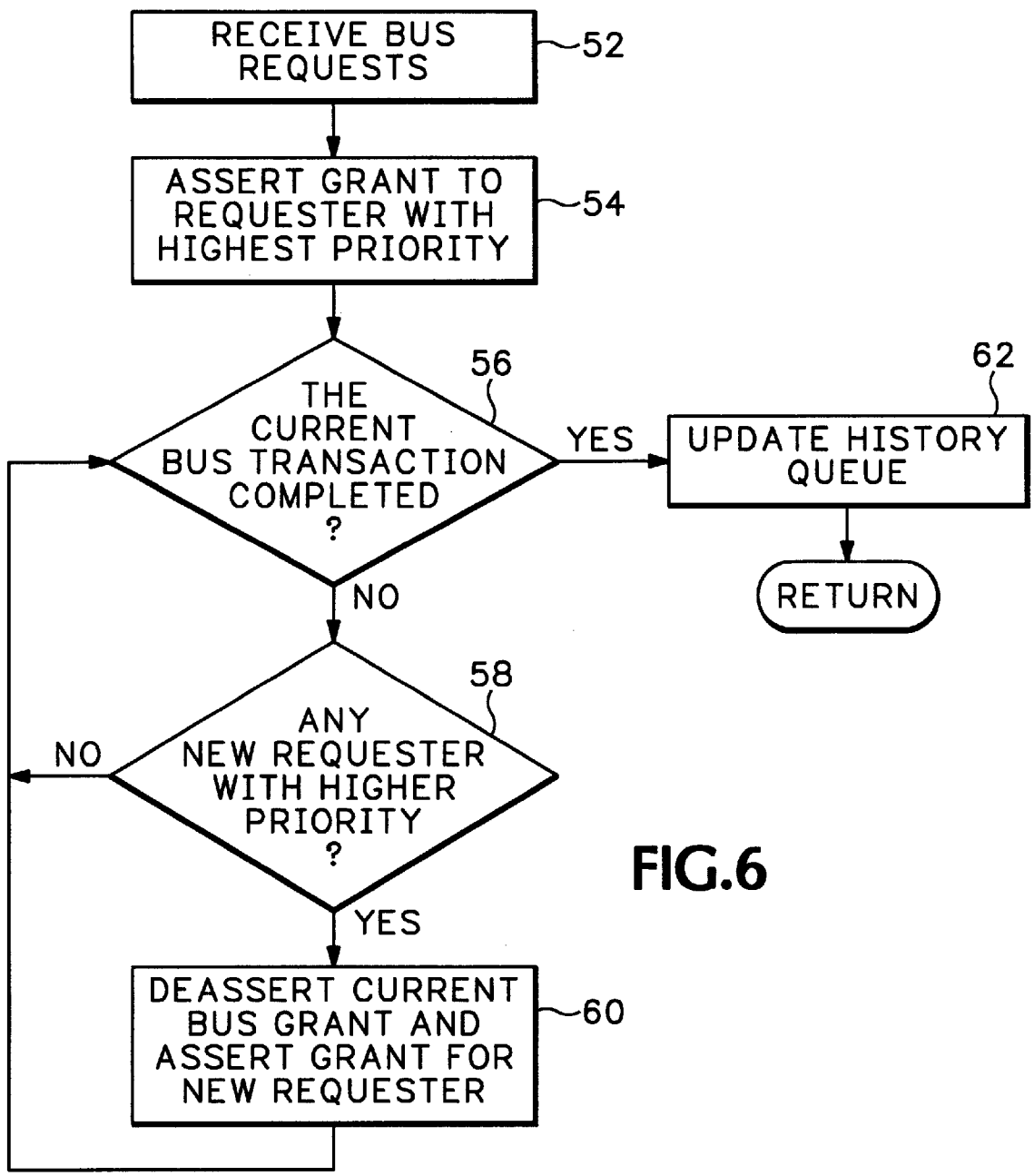
FIG. 6 is a step diagram showing a hidden arbitration scheme performed by the arbiter shown in FIG. 1.

Referring to FIG. 6, the arbiter 28 uses a hidden arbitration scheme while in state SbØ. The arbiter 28 receives bus requests in step 52 and checks the history queue 48. The arbiter 28 grants the bus to one of the requesting devices having the highest priority while waiting for the previous bus master to relinquish control of the bus (deassert FRAME_L) in step 54.

The arbiter 28 continues to monitor for bus requests in decision step 56 while the current bus transaction is being completed in step 56 by checking if FRAME_L is still asserted. If another bus request is detected, decision step 58 checks whether the new requester on the bus 20 has a higher priority than the device currently receiving the bus grant signal. If the new requester has higher priority, the arbiter 28 deasserts the original bus grant signal GNT_L and reasserts the bus grant signal GNT_L to the new requester with the higher priority in step 60. When the current bus transaction is completed in decision step 56, step 62 then updates the history queue. Only the device actually granted the bus 20 is demoted in priority in the history queue 48. The other devices that were only briefly granted the bus grant signal GNT_L retain their relative priority position in the history queue. The hidden arbitration scheme does not latch requests and is therefore, more "fair" because low frequency (but high priority) requestors have a better chance of being granted bus master.

Referring back to FIG. 5, when the FRAME_L signal is deasserted by the previously assigned bus master, the arbiter 28 moves from state SbØ to state Sb1 and then updates the history queue 48. As soon as the IRDY_L signal is deasserted by the previous bus master (bus idle condition), the control logic 44 jumps to state Sb2. The arbiter 28 continues to assert the bus grant signal GNT_L for an additional clock period in state Sb2. Thus, the state machine 50 guarantees assertion of the GNT_L signal for at least 2 clocks after the bus 20 becomes idle.

When a newly assigned bus master receives the bus grant signal GNT_L, it should assert FRAME_L when the bus 20 becomes idle. The idle condition occurs when both FRAME_L and IRDY_L are deasserted. In the state machine 50, SbØ waits for deassertion of FRAME_L and then state Sb1 waits for deassertion of IRDY_L. When the state machine 50 reaches Sb2, the bus 20 is idle and the new bus master should be able to start on the next bus cycle by asserting FRAME_L. However, some devices perform address stepping which requires one additional clock period to start FRAME_L after the bus becomes idle. Therefore, state Sb2 allows one more clock period for the bus master to assert FRAME_L, before taking the GNT_L signal away.

Address stepping is used when the bus master has a problem trying to drive all the address bits into valid states in one clock period. This may be caused by timing constraints or to reduce simultaneous switching current. Address stepping allows a bus master to drive some address bits in a first clock and the rest of the address bits in a second clock before asserting the FRAME_L signal. For a bus master using address stepping, the GNT_L signal may be latched during the first clock period of the bus addressing phase. The bus master then assumes the GNT_L signal is still asserted during the second clock period. This can cause contention problems since the GNT_L signal may be deasserted any time. To avoid contention problems, state Sb2 ensures the bus grant signal is deasserted one clock period prior to the assertion of the next bus grant signal.

In state Sb3, the GNT_L signal is deasserted, regardless of whether the FRAME_L signal is asserted or not asserted. Once the FRAME_L signal is asserted, the bus master owns the bus 20 as long as either FRAME_L or IRDY_L is asserted. Therefore, there is no need to hold the GNT_L signal beyond 2 clocks after the bus 20 becomes idle. From state Sb3, the state machine 50 jumps back to state Sb0 and asserts the bus grant signal GNT_L to the next highest priority requester.

Figure 7:
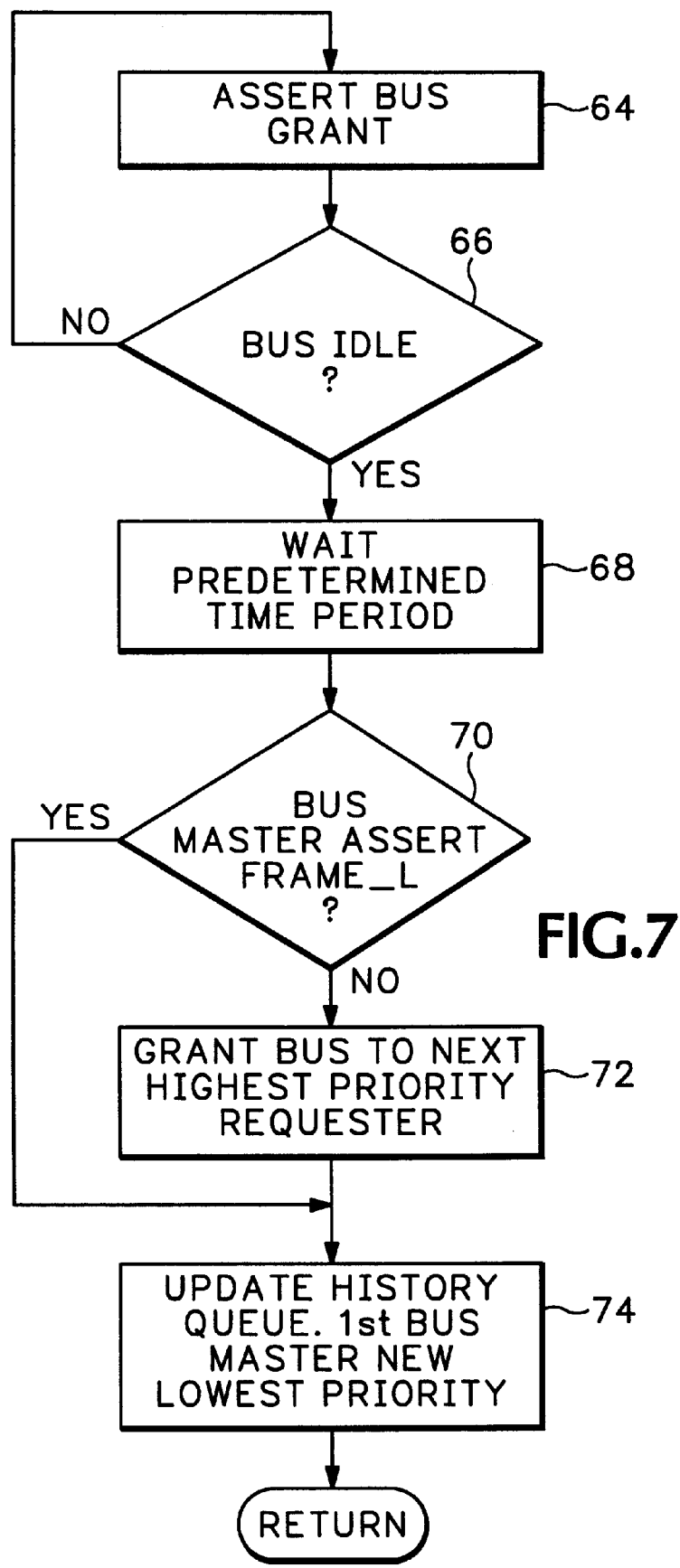
FIG. 7 is a step diagram showing a bus retry operation performed by the arbiter shown in FIG. 1.

Referring to FIG. 7, the arbiter grants the bus to the next bus master in step 64. While the current bus master asserts the FRAME_L signal, the next bus master waits for the bus to become idle before starting its bus cycle. The arbiter 28 in decision step 66 waits for the bus to become idle and then waits a predetermined time period of two clocks in step 68. If the newly granted master does not assert FRAME_L within 2 clocks after the bus 20 becomes idle in decision step 70, the arbiter 28 grants the bus 20 to the next highest priority requester in step 72. The new bus master can immediately start the bus cycle since the bus is already idle. Even though the first bus master failed to start the bus cycle, the history queue 48 is updated in step 74 showing the first bus master as being granted the bus cycle. As a result, the first master has the lowest priority next time the devices bid for the bus.

The arbiter 28 preserves bus bandwidth by removing grants and restarting arbitration if the newly granted master is slow to utilize the bus 20. The history queue lowers the priority of the degranted device, in turn, reducing the likelihood of the device further wasting bus bandwidth.

Hot swap operations are handled in the following manner. After a bus transaction is finished, the arbiter 28 holds at state Sb0, where the grant signal GNT_L for bus devices are inactive. A signal OIR on control bus 26 is used by the arbiter 28 as a hot swap indicator. The OIR signal is generated by an external field programmable gate array (FPGA) (not shown) based on the connectivity status of slot connector pins for cards containing any of the devices coupled to the bus 20. If the connectivity status of any of the monitored slot connector pins changes, the hot swap signal OIR is asserted. The arbiter 28 will not assert the GNT_L signal to any device while the hot swap signal OIR is asserted. Since no bus transaction is allowed during the hot swap, the bus 20 maintains functional stability when device cards are inserted or removed.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A bus arbiter for devices coupled to a bus, comprising:
    a history queue for tracking a plurality of previous bus grants to devices selected as bus master in earlier bus cycles;
    control logic coupled between the bus and the history queue that grants a current bus master to one of a plurality of requesting devices based on a first arbitration according to the plurality of previous bus grants in the history queue and bus request signals received from the requesting devices;
    the control logic conducting a first hidden arbitration during the current bus cycle that selects a next bus master for conducting a bus transaction on a next available bus cycle after the current bus master completes a current bus cycle; and
    the control logic also conducting a second hidden arbitration during that same current bus cycle while the granted next bus master waits for the next available bus cycle, wherein if the second hidden arbitration indicates that a different one of the requesting devices has a higher priority than the granted next bus master, the control logic selectively deasserts its original grant to the next bus master and asserts the grant for the next bus master to the device with higher priority.

2. A bus arbiter according to claim 1 wherein the devices in the history queue are dynamically reprioritized after completion of the current bus cycle according to how recently the devices were selected as bus master.

3. A bus arbiter according to claim 2 wherein the control logic includes the following:
    a first state that asserts a bus grant signal to one of the devices; and
    a second state that removes the bus grant signal after detecting an end to the previous bus cycle.

4. A bus arbiter according to claim 3 wherein the control logic changes from the first state to the second state after receiving a deasserted FRAME signal from the current bus master relinquishing control of the bus, the bus grant signal repeatedly reassigned during additional hidden arbitrations to any one of the devices later requesting the bus that has higher priority than the next bus master currently receiving the asserted bus grant signal until the FRAME signal is deasserted.

5. A bus arbiter according to claim 3 wherein the control logic reassigns the next bus master to another requesting device when the next bus master does not assert control of the bus a predetermined amount of time after completion of the previous bus cycle.

6. A bus arbiter according to claim 3 where the control logic monitors a hot swap signal and only switches to the second state when the hot swap signal indicates no hot swap operation is being conducted.

7. A bus arbiter according to claim 3 wherein the state machine includes the following:
    a third state extending a time period for removing the bus grant signal after detecting the end of the previous bus cycle thereby allowing address stepping; and
    a fourth state for removing the bus grant signal and returning back to the first state.

8. A bus arbiter according to claim 7 wherein the logic device when returning back to the first state automatically reassigns the device currently asserted the bus grant signal as next bus master from a highest priority to a lowest priority and reasserts the bus grant signal to one of the requesting devices having the next highest priority in the history queue.

9. A bus arbiter according to claim 1 wherein the control logic automatically rotates priority for assigning bus master after each bus cycle by demoting the current bus master to a lowest priority and promoting the devices not assigned as the bus master to a higher priority.

10. A method for arbitrating multiple processing elements requesting access to a shared resource, comprising:
    receiving requests from the processing elements for control of the shared resource;
    keeping a history queue of multiple previous grants of control for the shared resource, the history queue giving a higher priority to the processing elements with a longer history of not controlling the shared resource and a lower priority to the processing elements with a shorter history of not controlling the shared resource;
    conducting an arbitration granting one of the requesting processing elements identified in the history queue as having the longest history of not controlling the shared resource as a bus master for controlling the shared resource;

conducting a first arbitration for granting one of the processing elements as a next bus master for controlling the shared resource while the processing element currently granted the shared resource is conducting a transaction with the shared resource;

conducting a second arbitration while the processing element currently granted as the next bus master of the shared resource waits for the shared resource to become idle, the second arbitration selectively regranting control of the shared resource to any other requesting processing elements having a higher priority in the history queue than the processing element currently granted control as the next bus master of the shared resource; and updating the history queue only after the processing element currently granted as next bus master gains control of the shared resource.

11. A method according to claim 10 including the following steps:

detecting when the shared resource becomes available;

degranting the processing element as next bus master of the shared resource when the shared resource is not accessed within a predetermined amount of time after becoming available;

regranting the next bus master to another requesting processing element; and assigning the degranted processing element lowest priority in the history queue and assigning the regranted processing element second lowest priority in the history queue.

12. A method according to claim 10 including the following:

monitoring for a hot swap operation; and delay granting one of the processing elements as the next bus master of the shared resource when the hot swap operation is detected.

13. A method according to claim 10 wherein the step of keeping the history queue comprises the following steps:

tracking a predetermined number N of previous grants for the shared resource where N is greater than one;

assigning a highest priority to any of the requesting processing elements not granted control within the predetermined number N;

assigning a second highest priority to any of the processing elements granted control of the shared resource within the predetermined number N, the devices within the second highest priority having an increased priority when less recently granted control; and assigning a lowest priority to the last processing element granted control of the shared resource.

14. A method according to claim 10 wherein the shared resource is a bus and the processing elements while granted control of the shared resource transfer information over the bus during bus cycles.

15. A method according to claim 14 including conducting a round-robin arbitration scheme between any of the processing elements requesting control of the bus that have not been granted the bus within the predetermined number N of bus cycles.

16. A method according to claim 14 including the following steps:

detecting requests from the processing elements for control of the bus;

asserting a bus grant signal during the first arbitration to one of the requesting processing elements having a highest priority;

reasserting the bus grant signal during the second arbitration to any subsequently requesting processing elements having a higher priority than the processing element currently asserted with the bus grant signal until detecting deassertion of a bus control signal from one of the processing devices currently controlling the bus; and updating the history queue according to the processing element that receives the bus grant signal when the bus becomes idle.

17. A method according to claim 16 including updating the history queue by assigning the processing elements most recently assigned as the bus master to lower priorities and assigning devices less recently assigned as the bus master to higher priorities.

18. A method according to claim 14 including parking the bus on one of the processing elements when there are no requests for bus master.

19. A computer system, comprising:

a PCI bus including address lines, data lines and control lines for transferring data during bus cycles;

multiple processing devices coupled to the PCI bus;

an arbiter coupled to the bus receiving bus_req signals from any one of the multiple processing devices and transmitting a bus_grant signal to any one of the multiple processing devices according to a first arbitration for a next bus cycle while a current bus cycle is being conducted, the arbiter asserting the bus_grant signal to one of the multiple processing devices for controlling the bus according to the received bus_req signals and a stored history queue indicating how recently the processing devices were granted use of the bus; and the arbiter reassigning the bus_grant signal to another processing device according to a second arbitration when the processing device currently receiving the bus_grant signal fails to gain control of the bus after the bus becomes idle for a predetermined amount of time after the current bus cycle has completed and then lowering the priority in the history queue for the processing device failing to gain control of the bus within that predetermined amount of time.

20. A computer system according to claim 19 wherein the arbiter asserts the bus_grant signal for at least two clock cycles after assertion of a IRDY signal for conducting address stepping operations in the processing devices.

21. A computer system according to claim 20 wherein the arbiter asserts the bus_grant signal prior to deassertion of a FRAME signal on the control lines that indicates completion of the current bus cycle, the arbiter repeatedly conducting arbitrations during the current bus cycle until the FRAME signal is deasserted by one of the processing elements currently controlling the bus, the additional arbitrations repeatedly reassigning the bus_grant signal to processing elements having higher priority than the processing element currently receiving the asserted bus_grant signal.

22. The computer system of claim 19, wherein at least one of the received bus_req signals can be used to indicate an elevated priority request for one of the multiple processing devices.

23. The bus arbiter of claim 1, wherein the arbiter bases its bus master grants at least in part upon an elevated priority indicated by one of the requesting devices.

* * * * *